US011232034B2

(12) United States Patent
Harihar et al.

(10) Patent No.: US 11,232,034 B2
(45) Date of Patent: Jan. 25, 2022

(54) METHOD TO ENABLE THE PREVENTION OF CACHE THRASHING ON MEMORY MANAGEMENT UNIT (MMU)-LESS HYPERVISOR SYSTEMS

(71) Applicant: Infineon Technologies AG, Neubiberg (DE)

(72) Inventors: Manoj Kumar Harihar, Germering (DE); Romain Ygnace, Brunnthal (DE)

(73) Assignee: Infineon Technologies AG, Neubiberg (DE)

(*) Notice: Subject to any disclaimer, the term of this patent is extended or adjusted under 35 U.S.C. 154(b) by 283 days.

(21) Appl. No.: 16/585,507

(22) Filed: Sep. 27, 2019

(65) Prior Publication Data

US 2021/0096899 A1    Apr. 1, 2021

(51) Int. Cl.
*G06F 12/0846*    (2016.01)
*G06F 9/455*    (2018.01)
*G06F 12/0875*    (2016.01)

(52) U.S. Cl.
CPC ...... *G06F 12/0846* (2013.01); *G06F 9/45558* (2013.01); *G06F 12/0875* (2013.01); *G06F 2009/45583* (2013.01); *G06F 2212/657* (2013.01)

(58) Field of Classification Search
CPC ............. G06F 9/45558; G06F 12/0875; G06F 2009/45583; G06F 2212/657
See application file for complete search history.

(56) References Cited

U.S. PATENT DOCUMENTS

| | | | |
|---|---|---|---|
| 10,133,641 B2 * | 11/2018 | Guthrie | G06F 12/0842 |
| 11,030,101 B2 * | 6/2021 | Saidi | G06F 12/126 |
| 2018/0081814 A1 * | 3/2018 | Gellerich | G06F 12/0811 |

* cited by examiner

*Primary Examiner* — Jacob D Dascomb
(74) *Attorney, Agent, or Firm* — Eschweiler & Potashnik, LLC

(57) ABSTRACT

A cache circuit associated with a hypervisor system is disclosed. The cache circuit comprises a cache memory circuit comprising a plurality of cachelines, wherein each cacheline is configured to store data associated with one or more virtual machines (VMs) of a plurality of VMs associated with the hypervisor system and a plurality of tag array entries respectively associated with the plurality of cachelines. In some embodiments, each tag array entry of the plurality of tag entries comprises a tag field configured to store a tag identifier (ID) that identifies an address of a main memory circuit to which a data stored in the corresponding cacheline is associated and a VM tag field configured to store a VM ID associated with a VM to which the data stored in the corresponding cacheline is associated.

26 Claims, 4 Drawing Sheets

METHOD TO ENABLE THE PREVENTION OF CACHE THRASHING ON MEMORY MANAGEMENT UNIT (MMU)-LESS HYPERVISOR SYSTEMS

FIELD

The present disclosure relates to memory management unit (MMU)-less hypervisor systems, and in particular, to a system and method to enable the prevention of cache thrashing on MMU-less hypervisor systems.

BACKGROUND

Virtualization is a proven technology that enables the abstraction—or virtualization—of computing resources. A relatively small control program called Virtual Machine Monitor (VMM) or Hypervisor is placed between the operating system (OS) and the hardware. Typically, the hypervisor executes in privileged mode and can host one or more operating systems—Guest OSs—in a sandbox called Virtual Machine: a controlled construct of the underlying hardware. Each virtual machine (VM) operates under the illusion of exclusive access to the processors, peripherals, memory and input/output (I/O). The hypervisor arbitrates access to all shared resources in a similar way to how a traditional operating system enables the concurrent executions of user processes. While the performance of this virtual system is not equal to the performance of the operating system running on true hardware, the concept of virtualization works because most guest operating systems and applications don't need the full use of the underlying hardware. This allows for greater flexibility, control and isolation by removing the dependency on a given hardware platform.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
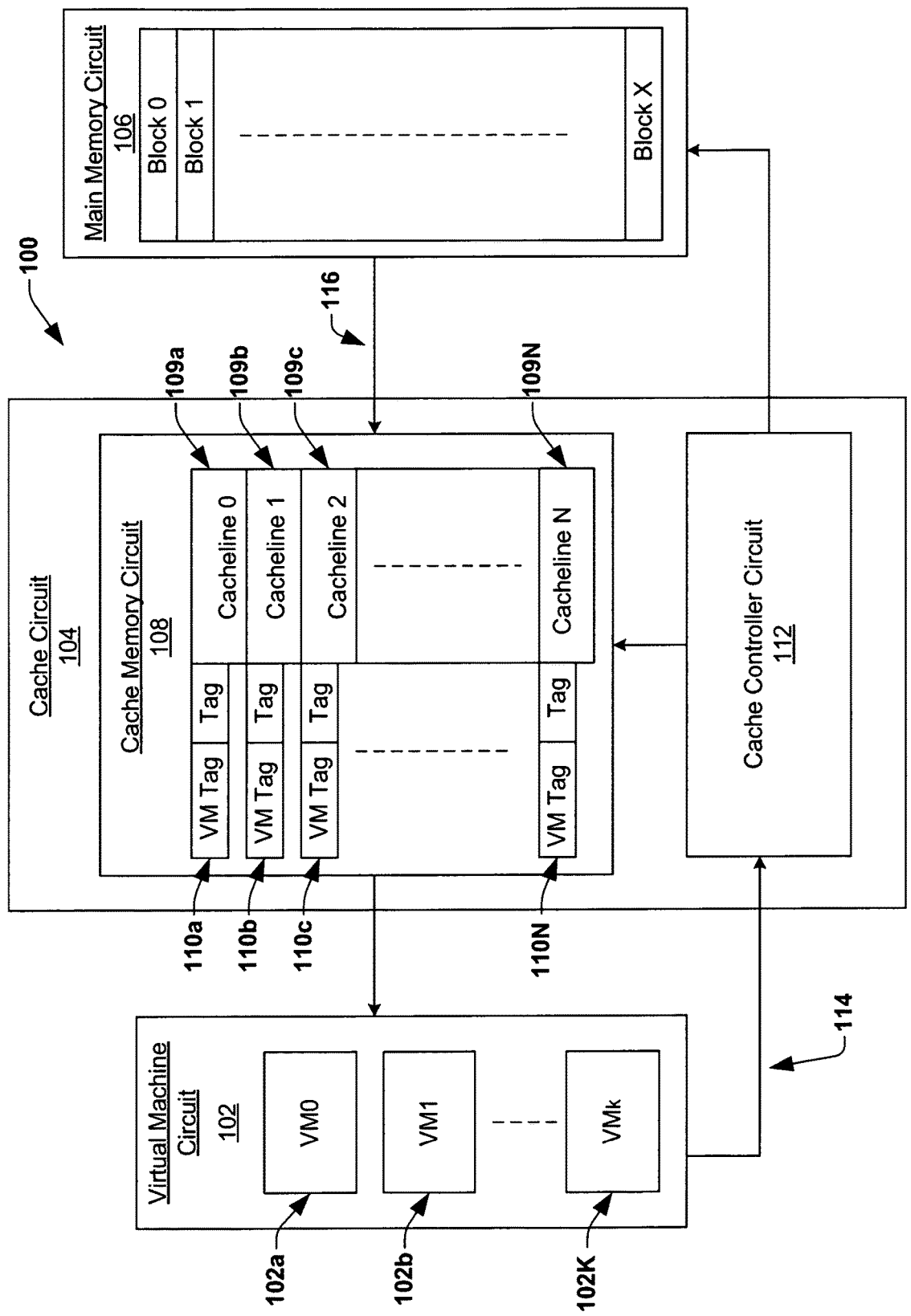
FIG. 1 illustrates a simplified block diagram of a hypervisor system, according to one embodiment of the disclosure.

In one embodiment of the disclosure, a cache circuit associated with a hypervisor system is disclosed. The cache circuit comprises a cache memory circuit comprising a plurality of cachelines. In some embodiments, each cacheline of the plurality of cachelines is configured to store data associated with one or more virtual machines (VMs) of a plurality of VMs associated with the hypervisor system. In some embodiments, the cache memory circuit further comprises a plurality of tag array entries respectively associated with the plurality of cachelines. In some embodiments, each tag array entry of the plurality of tag entries comprises a tag field configured to store a tag identifier (ID) that identifies an address of a main memory circuit to which a data stored in the corresponding cacheline is associated and a VM tag field configured to store a VM ID associated with a VM to which the data stored in the corresponding cacheline is associated.

In one embodiment of the disclosure, a hypervisor system is disclosed. The hypervisor system comprises a virtual machine (VM) circuit comprising a plurality of VMs, each VM configured to perform one or more operations associated with the hypervisor system. In some embodiments, the hypervisor system further comprises a cache circuit comprising a cache memory circuit that comprises a plurality of cachelines, each cacheline configured to store data associated with one or more virtual machines (VMs) of the plurality of VMs associated with the hypervisor system. In some embodiments, the cache memory circuit further comprises a plurality of tag array entries respectively associated with the plurality of cachelines. In some embodiments, each tag array entry of the plurality of tag entries comprises a tag field configured to store a tag identifier (ID) that identifies an address of a main memory circuit to which a data stored in the corresponding cacheline is associated and a VM tag field configured to store a VM ID associated with a VM to which the data stored in the corresponding cacheline is associated.

In one embodiment of the disclosure, a method for a cache circuit associated with a hypervisor system is disclosed. The method comprises storing an incoming cacheline data comprising data associated with a select VM of a plurality of VMs associated with the hypervisor system, in a select cacheline of a plurality of cachelines associated with a cache memory circuit; and storing a VM ID associated with the select VM within a VM tag field of a tag array entry within the cache memory circuit that is associated with the select cacheline, when a cache hit associated with the select VM occurs.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, virtualization enables the abstraction of computing resources. Multiple virtual machines can run simultaneously on the same physical computer. In a virtualized system, the subject of memory management is very important and can lead to substantial complexity. In some embodiments, multiple virtual machines associated with a hypervisor system may share a same memory (e.g., cache). In some embodiments, hypervisor systems utilize memory management unit (MMU) for virtual memory management. In MMU based hypervisor systems, each guest operating system (OS) running inside a Virtual Machine, is allocated a virtual memory, and the hypervisor performs address translations using the MMU, in order to manage the virtual memory. However, virtualization is moving into systems without MMU. In MMU-less hypervisor systems, sharing a cache between different virtual machines (VMs) may result in cache thrashing. A cache is a smaller, faster memory, closer to a processor core, which stores copies of the data from frequently used main memory locations. When the processor (e.g., the VMs) needs to read or write a location in main memory, it first checks for a corresponding entry in the cache. The cache checks for the contents of the requested memory location in any cache lines that might contain that address. If the requested memory location is in the cache, a cache hit has occurred. However, if the requested memory location is in the cache, a cache miss has occurred. In the case of a cache hit, the processor immediately reads or writes the data in the cache line. For a cache miss, the cache allocates a new entry and copies data from main memory, and then the request is fulfilled from the contents of the cache.

When new data is to be loaded to cache during a cache miss & there is no free cacheline available within the cache, then a filled cacheline comprising data must be evicted. A cacheline to be evicted is chosen based on some predefined replacement polices. The fundamental problem with any replacement policy is that it must predict which existing cache entry is least likely to be used in the future. Predicting the future is difficult, so there is no perfect method to choose among the variety of replacement policies available. One popular replacement policy, least-recently used (LRU), replaces the least recently accessed entry. However, in embodiments where multiple VMs share the same cache, a cacheline fetched by one VM can evict and replace the cacheline from another VM during a cache miss, sometimes referred to as cache thrashing. This means, the performance of any specific VM is affected negatively compared to standalone execution. If any one VM is assigned for real-time/high performance operation—the performance is negatively affected. In the worst case, any access will always result in a cache miss.

Therefore, in order to overcome the above disadvantages, a cache circuit that is virtual machine (VM) aware is proposed in this disclosure. In particular, in one embodiment, a cache circuit comprising a cache memory circuit that comprises a plurality of cachelines, wherein each cacheline is associated with a VM tag field configured to store a VM identifier (ID) associated with a VM to which a data stored in the corresponding cacheline is associated, is proposed herein. In some embodiments, the proposed cache memory circuit is configured to store an incoming cacheline data comprising data associated with a select VM, in a select cacheline of the plurality of cachelines and store a VM ID associated with the select VM within the VM tag field that is associated with the select cacheline, when a cache miss associated with the select VM occurs. In another embodiment, a cache controller circuit associated with the cache circuit that is configured to determine a filled cacheline associated with the cache memory circuit to be evicted, in order to store the incoming cacheline, based on the VM ID associated with the filled cacheline, in accordance with a predefined cache replacement algorithm is also proposed. In some embodiments, the cache replacement algorithm is implemented based on a priority of the VM ID. In some embodiments, utilizing the VM ID of the cacheline, in order to determine the filled cacheline to be evicted, enables to implement cache replacement algorithms based on the priority of the VM ID associated with the corresponding filled cacheline. For example, in one example embodiment, a cache replacement algorithm that prevents a cacheline having high priority VM ID from being replaced by incoming cacheline with lower priority VM ID may be implemented.

FIG. 1 illustrates a simplified block diagram of a hypervisor system 100, according to one embodiment of the disclosure. In some embodiments, the hypervisor system 100 may be part of a host machine configured to host one or more virtual machines (VMs). In some embodiments, the host machine may be a personal computer (PC), a server computer, mainframe or other computing system. In some embodiments, the hypervisor system 100 comprises a memory management unit (MMU)-less hypervisor system that does not include an MMU for memory management. In some embodiments, the hypervisor system 100 comprises an embedded hypervisor system or a real-time hypervisor system. The hypervisor system 100 comprises a virtual machine (VM) circuit 102, a cache circuit 104 and a main memory circuit 106. In some embodiments, the VM circuit 102 comprises a plurality of virtual machines $VM_1$, $VM_2$ ... $VM_K$, where K is any real number. In some embodiments, each VM of plurality of virtual machines $VM_1$, $VM_2$ ... $VM_K$ may be configured to perform one or more operations associated with the hypervisor system 100. In some embodiments, the hypervisor system 100 may further comprise a hypervisor circuit (not shown) configured to manage the plurality of virtual machines $VM_1$, $VM_2$ ... $VM_K$ associated with the VM circuit 102.

In some embodiments, each VM of the plurality of virtual machines $VM_1$, $VM_2$ ... $VM_K$ may be configured with a VM identifier (ID) that identifies the corresponding VM. In some embodiments, a set of VMs within the plurality of virtual machines $VM_1$, $VM_2$ ... $VM_K$ may be assigned the same VM ID. In some embodiments, the VM ID assigned to a select VM or the set of VMs is configurable. In other words, based on the process requirements, the VM ID assigned to the select VM or the set of VMs may be changed. In some embodiments, each VM ID has a predefined priority associated therewith. In some embodiments, the priority associated with the VM IDs is configurable. In some embodiments, the cache circuit 104 comprises a cache memory circuit 108 and a cache controller circuit 112. In some embodiments, the cache memory circuit 108 comprises a smaller, faster memory, closer to a processor core (e.g., $VM_1$, $VM_2$ ... $VM_K$), which stores copies of the data from frequently used locations associated with the main memory circuit 106. In some embodiments, the main memory circuit 106 comprises a plurality of memory blocks (block 0, block 1 ... block X) comprising data, each memory block having an address associated therewith.

In some embodiments, the cache memory circuit 108 comprises a plurality of cachelines 109a, 109b, 109c ... 109N, wherein each cacheline is configured to store data associated with one or more virtual machines (VMs) of the plurality of VMs, $VM_1$, $VM_2$ ... $VM_K$ associated with the hypervisor system 100. In some embodiments, the cache memory circuit 108 further comprises a plurality of tag array entries 110a, 110b, 110c ... 110N, respectively associated with the plurality of cachelines 109a, 109b, 109c ... 109N. In some embodiments, each tag array entry of the plurality of tag entries 110, 110b, 110c ... 110N comprises a tag field configured to store a tag identifier (ID) that identifies an address of the main memory circuit 106 to which a data stored in the corresponding cacheline is associated. In some embodiments, each address associated with the main memory circuit 106 may be decoded into a tag ID, an index and an offset, each comprising a set of bits. Therefore, when a memory block associated with the main memory circuit 106 is copied into a cacheline, a tag ID (derived from the address of the memory block) is stored in the tag field of the corresponding cacheline. In some embodiments, each tag array entry of the plurality of tag entries 110a, 110b, 110c ... 110N further comprises a VM tag field configured to store a VM ID associated with a VM to which the data stored in the corresponding cacheline is associated. For example, if the cacheline 109a comprises a data associated with the VM0, the VM ID associated with VM0 is stored within the VM tag field of the tag array entry 110a. Further, a tag ID that identifies an address of the main memory circuit 106 to which the data stored in the corresponding cacheline is associated is stored in the tag field of the tag array entry 110a.

In some embodiments, the cache memory circuit 108 is configured with a predefined associativity. In such embodiments, the cache memory circuit 108 may be divided into one or more sets of cachelines, that forms one or more cacheline sets, each cacheline set comprising one or more cachelines, based on the associativity. For example, for an n-way associative cache, the cache memory circuit 108 may be divided into a plurality of cacheline sets, each cacheline set comprising n cachelines. Alternately, for a fully associative cache, the cache memory circuit 108 comprises a single cacheline set comprising all of the cachelines associated with the cache memory circuit 108. In some embodiments, for example, for n-way set associative cache, each memory block associated with the main memory circuit 106 is mapped to a specific cacheline set of the one or more cacheline sets associated with the cache memory circuit 108. In some embodiments, the specific cacheline set to which each memory block of the main memory circuit 108 is mapped is defined based on the index bits derived from the address of the corresponding memory block. In such embodiments, each memory block associated with the main memory circuit 106 may be stored only in one of the n cachelines within the specific cacheline set, identified by the index bits of the address associated with the corresponding memory block. However, for a fully associative cache, each memory block associated with the main memory circuit 106 may be stored in any cacheline of the plurality of cachelines 109a, 109b, 109c ... 109N associated with the cache memory circuit 108.

In some embodiments, when a select VM, say VM1, needs to read data from the main memory circuit 106, the VM1 is configured to provide a data request 114 to the cache circuit 104, in order to access the data required by the VM1. In some embodiments, the data request 114 comprises an address associated with the main memory circuit 106 that stores the required data. In some embodiments, a cache controller circuit 112 associated with the cache circuit 104 is configured to process the data request 114 and derive a tag ID associated with the address comprised within the data request 114. Upon determining the tag ID, in some embodiments, the cache controller circuit 112 is configured to look up the tag ID in the tag field associated with a set of tag array entries of the plurality of tag array entries, 110a, 110b, 110c ... 110N, based on the predefined associativity defined for the cache memory circuit 108.

In particular, for a fully associative cache, the cache controller circuit 112 may be configured to look up the tag ID in the tag field associated with all the tag array entries of the plurality of tag array entries, 110a, 110b, 110c ... 110N. Therefore, in such embodiments, the set of tag array entries comprise all the tag array entries of the plurality of tag array entries, 110a, 110b, 110c ... 110N. However, for an n-way set associative cache, the cache controller circuit 112 may be further configured to derive the index bits associated with the address comprised within the data request 114, in order to determine the cacheline set associated with the requested data. Upon deriving the index bits, in some embodiments, the cache controller circuit 112 is configured to determine the cacheline set associated with the requested data, based thereon and look up the tag ID in the tag field associated with a set of tag array entries associated with the cacheline set, in order to determine if the requested data is present in the cache memory circuit 108.

If a cache hit occurs, that is, a matching tag ID is found within the set of tag array entries of the plurality of tag array entries 110a, 110b, 110c . . . 110N, the cache controller circuit 112 is configured to provide/move the data stored in a corresponding cacheline to the select VM, VM1. In embodiments where the matching tag ID is not found within the set of tag array entries of the plurality of tag array entries 110a, 110b, 110c . . . 110N, a cache miss occurs. In such embodiments, the cache controller circuit 112 is configured to access/fetch the required data for VM1, from the main memory circuit 106, based on the address comprised within the data request 114. In such embodiments, the cache controller circuit 112 is further configured to load the required data for VM1, from the main memory circuit 106, that forms an incoming cacheline data 116, to a select cacheline of the plurality of cachelines 109a, 109b, 109c . . . 109N associated with the cache memory circuit 108. In some embodiments, the incoming cacheline data 116 comprises data comprised within a memory block of the main memory circuit 106.

In such embodiments, the cache memory circuit 108 is configured to store the incoming cacheline data 116 comprising data associated with the VM1, in the select cacheline within the plurality of cachelines 109a, 109b, 109c . . . 109N. In some embodiments, the cache memory circuit 108 is further configured to store a tag ID associated with the incoming cacheline data 116 (derived from the address of the incoming cacheline data 116) in the tag field of the tag array entry associated with the select cacheline. In addition, the cache memory circuit 108 is configured to store a VM ID associated with VM1 in the VM tag field of the tag array entry associated with the select cacheline. In some embodiments, the cache controller circuit 112 may be configured to provide the tag ID associated with the incoming cacheline data 116 to the cache memory circuit 108 to be stored within the tag field of the tag array entry associated with the select cacheline. In addition, the cache controller circuit 112 may be configured to provide the VM ID associated with VM1 to the cache memory circuit 108 to be stored within the VM tag field of the tag array entry associated with the select cacheline.

Prior to loading the incoming cacheline data 116 into the select cacheline associated with the cache memory circuit 108, in some embodiments, the cache controller circuit 112 is further configured to determine the select cacheline within the plurality of cachelines 109a, 109b, 109c . . . 109N to be utilized to store the incoming cacheline data 116 associated with VM1. In some embodiments, the cache controller circuit 112 is configured to determine the select cacheline to be utilized to store the incoming cacheline data 116 associated with VM1 from a set of available cachelines within the plurality of cachelines 109a, 109b, 109c . . . 109N. In some embodiments, the set of available cachelines comprises one or more cachelines within the plurality of cachelines 109a, 109b, 109c . . . 109N that are configured/available for storing the incoming cacheline data 116 associated with the select VM, VM1. In some embodiments, the set of available cachelines are defined, based on the predefined associativity defined for the cache memory circuit 108. In some embodiments, for example, for an n-way associative cache, the set of available cachelines for the incoming cacheline data 116 comprises a set of cachelines associated with a specific cacheline set (configured for a memory block associated with the incoming cacheline data 116), derived based on the index bits of the address associated with the incoming cacheline data 116. However, for a fully associative cache, the set of available cachelines for the incoming cacheline data 116 comprises all the cachelines of the plurality of cachelines 109a, 109b, 109c . . . 109N.

Further, in some embodiments, one or more cachelines within the plurality of cachelines of the cache memory circuit 108 are reserved for a select VM ID. Therefore, in such embodiments, the set of available cachelines for the incoming cacheline 116 associated with the select VM, say VM1, comprises a set of cachelines that are configured for the incoming cacheline data 116 based on the predefined associativity and that are not reserved for a VM ID other than the VM ID associated with the select VM, VM1. In some embodiments, the one or more cachelines within the plurality of cachelines of the cache memory circuit 108 are reserved for the select VM ID, based on configuring a VM aware associativity for the cache memory circuit 108. In such embodiments, for n-way set associative cache, for each cacheline set, m out of n cachelines are reserved/assigned to the select VM ID. Alternately, for a fully associative cache, m cachelines out of all the cachelines associated with the cache memory circuit 108 is reserved/assigned to the select VM.

Figure 2:
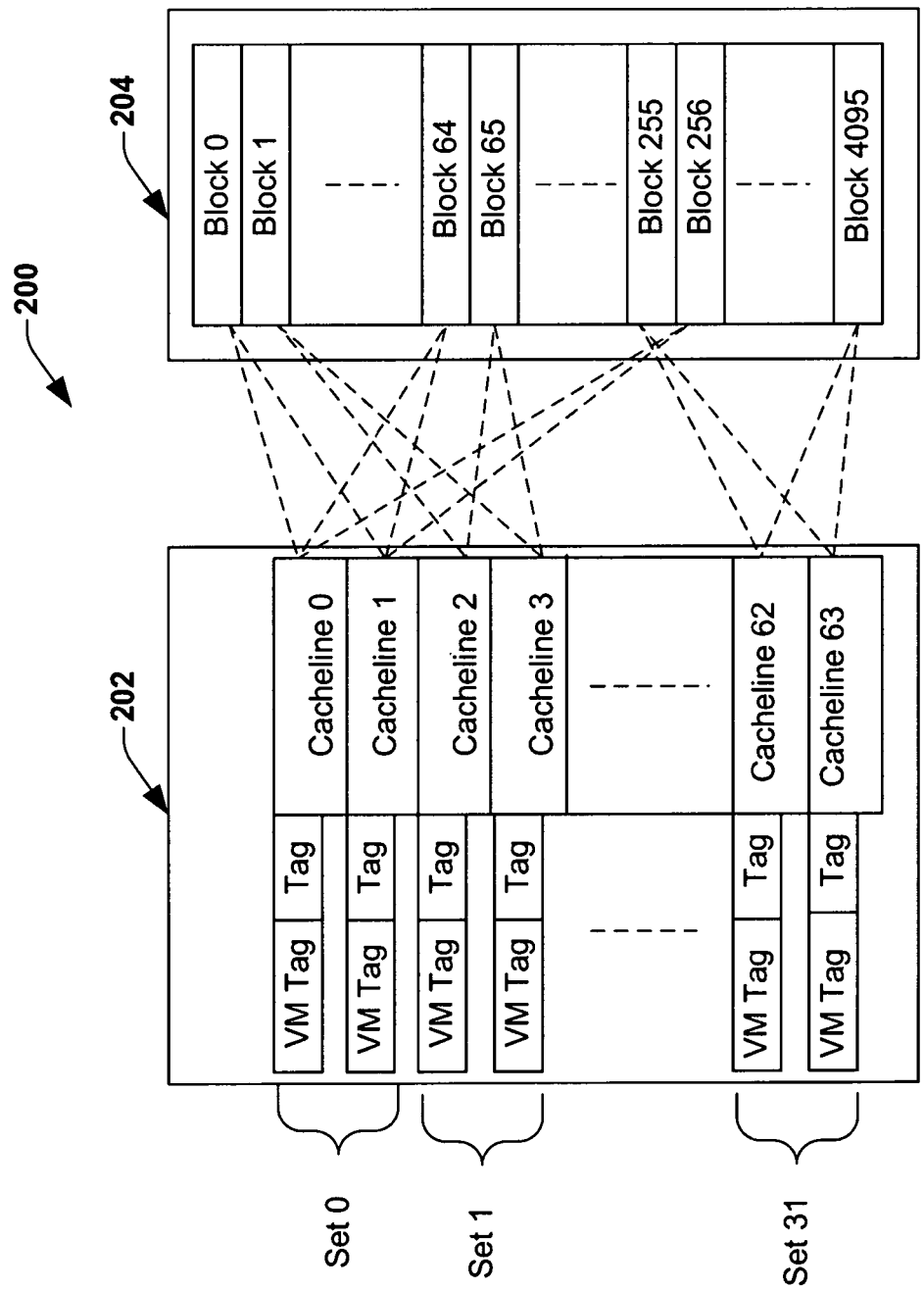
FIG. 2 illustrates an example implementation of a hypervisor system comprising a cache memory circuit and a main memory circuit, according to one embodiment of the disclosure.

FIG. 2 illustrates an example implementation of a cache memory circuit 202 and a main memory circuit 204 associated with a hypervisor system 200, according to one embodiment of the disclosure. In some embodiments, the cache memory circuit 202 and the main memory circuit 204 comprises one possible way of implementation of the cache memory circuit 108 and the main memory circuit 106 of FIG. 1, respectively. In this example embodiment, the main memory circuit 204 comprises a memory size of 16 Kbytes, and a memory block size of 4 bytes. Further, the cache memory circuit 204 comprises a cache size of 256 bytes and a block size of 4 bytes, thereby forming 64 blocks or cachelines as shown. In this embodiment, the cache memory circuit 202 is configured to be 2-way set associative. Therefore, in this embodiment, the cache memory circuit 202 is divided into a plurality of cacheline sets, each cacheline set comprising 2 cachelines. Accordingly, the cache memory circuit 202 comprises 32 cacheline sets, set 0, set 1 . . . set 31. However, in other embodiments, the cache memory circuit 202 may be n-way set associative or fully associative.

In this embodiment, block 0 of the main memory circuit 204 is mapped to set 0 of the cache memory circuit 202. The mapping between the blocks of the main memory circuit 204 and the sets of the cache memory circuit 202 may be different in different embodiments. Therefore, in this embodiment, when an incoming cacheline data associated with a select VM (e.g., the incoming cacheline data 116 in FIG. 1) comprises block 0 of the main memory circuit 204, then the incoming cacheline data can be loaded only to cacheline 0 or cacheline 1 associated with the set 0 of the cache memory circuit 202. Therefore, in such embodiments, the set of available cachelines for the incoming cacheline data comprises only cacheline 0 and cacheline 1. Further, in embodiments where the cacheline 0 is reserved for a VM ID that is different from the VM ID associated with select VM, based on a VM aware associativity, the set of available cachelines for the incoming cacheline data comprises only cacheline 1.

Referring back to FIG. 1, when the set of available cachelines for the incoming cacheline data 116 associated with VM1 comprises one or more free cachelines having no data stored within, the cache controller circuit 112 is configured to choose the select cacheline for storing the incoming cacheline data 116 associated with the select VM, from the one or more free cachelines. In embodiments where the set of available cachelines comprises multiple free cachelines, the cache controller circuit 112 may be configured to choose the select cacheline from the multiple free cachelines, based on some predefined criteria. Alternately, when the set of available cachelines for the incoming cacheline data 116 associated with VM1 comprises a set of filled cachelines, respectively, each filled cacheline having data stored within, the cache controller circuit 112 is configured to choose the select cacheline for storing the incoming cacheline data 116 associated with VM1, from the set of filled cachelines, based on the VM ID stored within the VM tag field associated with the set of filled cachelines, in accordance with a predefined cacheline replacement algorithm, further details of which are given in an embodiment below. In some embodiments, the predefined cacheline replacement algorithm is implemented based on a priority associated with the VM IDs stored within the VM tag field of the set of filled cachelines.

Figure 3:
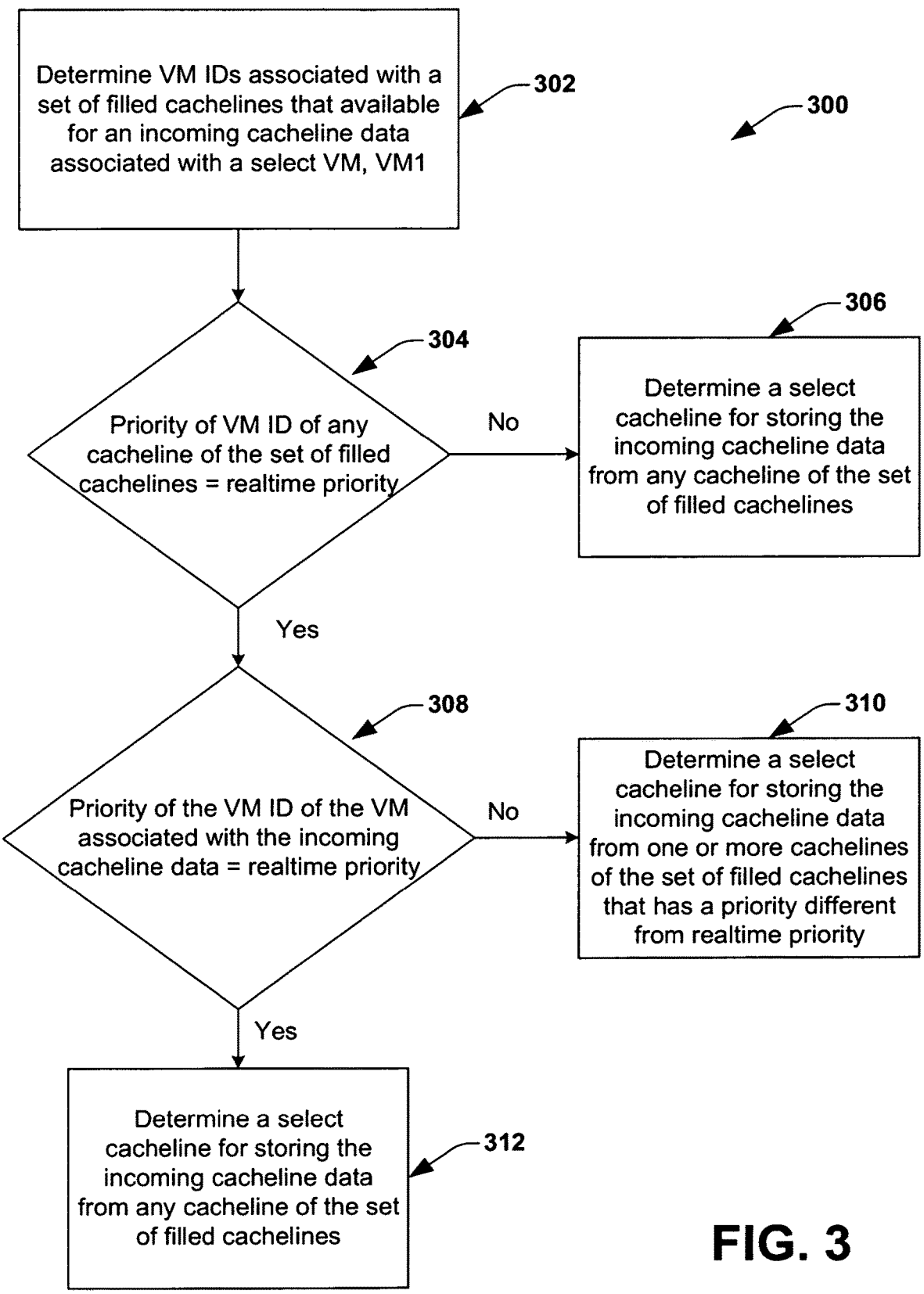
FIG. 3 illustrates an example cache replacement algorithm, according to one embodiment of the disclosure.

FIG. 3 illustrates an example cache replacement algorithm 300, according to one embodiment of the disclosure. In some embodiments, the cache replacement algorithm 300 enables to determine a filled cacheline associated with a cache memory circuit that is to be replaced with an incoming cacheline data, during a cache miss. In some embodiments, the cache replacement algorithm 300 may be implemented within the cache controller circuit 112 of FIG. 1, in order to determine a filled cacheline within the cache memory circuit 108 that needs to be replaced with the incoming cacheline data 116. Therefore, the cache replacement algorithm 300 is explained herein with reference to the hypervisor system 100 in FIG. 1. In some embodiments, the cache replacement algorithm 300 is implemented when a set of available cachelines for an incoming cacheline data associated with a select VM comprises filled cachelines comprising data stored within, when a cache miss associated with the select VM occurs. In some embodiments, the cache replacement algorithm 300 enables to prevent a filled cacheline having a real-time priority (or a predefined high priority) from being replaced by an incoming cacheline having non real-time priority (or a lower priority). However, in other embodiments, the cache replacement algorithm 300 may be implemented differently.

At 302, virtual machine (VM) identifiers (IDs) associated with a set of filled cachelines that are available for an incoming cacheline data (e.g., the incoming cacheline data 116 in FIG. 1) associated with a select VM is determined. In some embodiments, the VM IDs associated with the set of filled cachelines are determined, based on the VM IDs stored within the VM tag fields associated with the set of filled cachelines. At 304, a determination whether a priority of VM ID of any cacheline of the set of filled cachelines comprises real-time priority (or any other predefined priority) is made. If No at 304, the algorithm proceeds to 306. At 306, a select cacheline for storing the incoming cacheline data is determined from any cacheline of the set of filled cachelines. In such embodiments, the select cacheline may be determined from the set of filled cachelines based on a predefined criteria, for example, a least recently used (LRU) cacheline. In some embodiments, an LRU cacheline is determined based on an LRU bit included within the tag array entry associated with the corresponding cacheline.

If yes at 304, the algorithm proceeds to 308. At 308, a determination is made whether a priority of the VM ID of the select VM associated with the incoming cacheline data comprises real-time priority. If No at 308, the algorithm proceeds to 310. At 310, a select cacheline for storing the incoming cacheline data is determined from one or more filled cachelines of the set of filled cachelines that has non real-time priority. In some embodiments, when the one or more cachelines having non real-time priority comprises multiple cachelines, the select cacheline may be determined based on a predefined criterion, for example, a least recently used (LRU) cacheline. In some embodiments, an LRU cacheline is determined based on an LRU bit included within the tag array entry associated with the corresponding cacheline. If yes at 308, the algorithm proceeds to 312. At 312, a select cacheline for storing the incoming cacheline data is determined from any cacheline of the set of filled cachelines. In such embodiments, the select cacheline may be determined from the set of filled cachelines based on a predefined criterion, for example, a least recently used (LRU) cacheline. In some embodiments, an LRU cacheline is determined based on an LRU bit included within the tag array entry associated with the corresponding cacheline.

Figure 4:
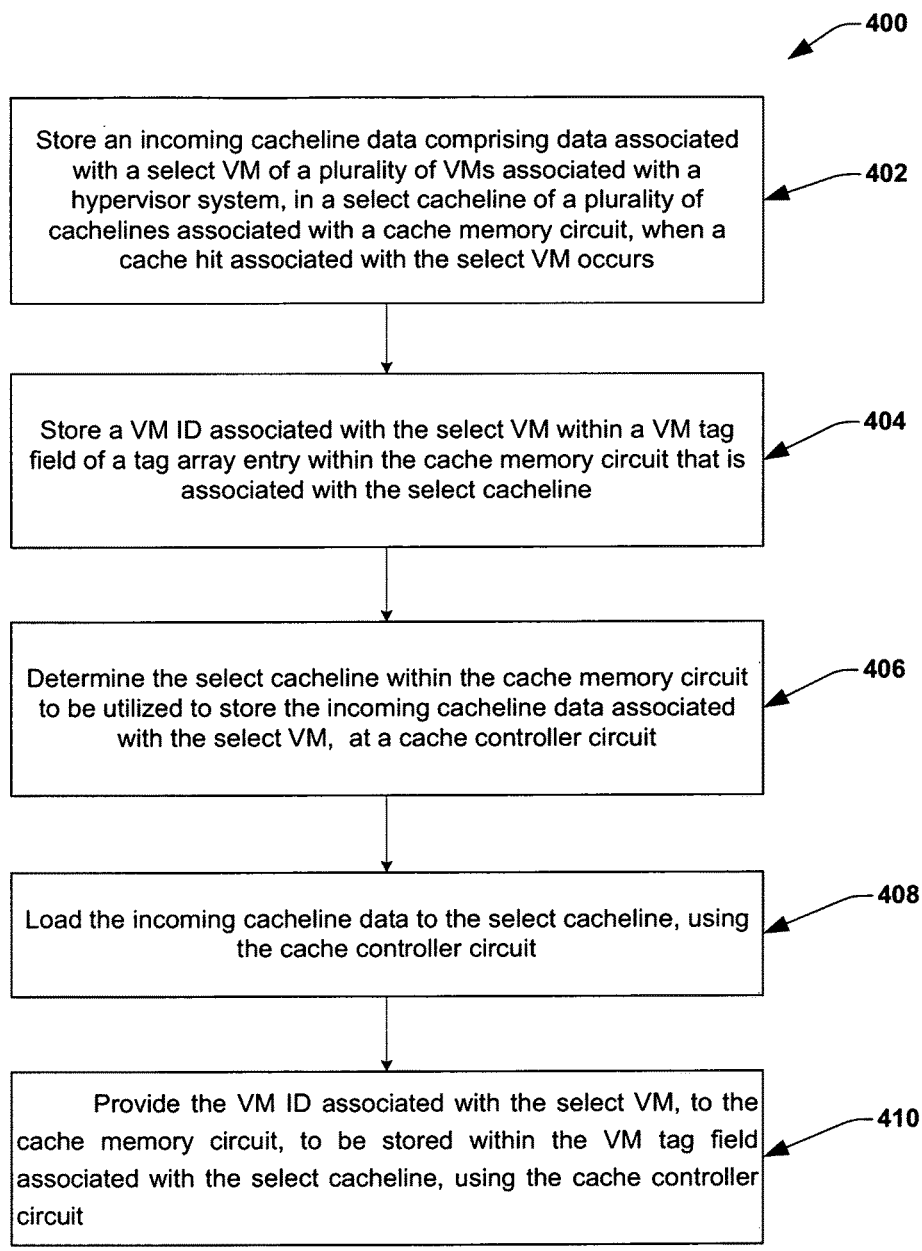
FIG. 4 illustrates a flow chart of a method for a cache circuit associated with a memory management unit (MMU)-less hypervisor system, according to one embodiment of the disclosure.

FIG. 4 illustrates a flow chart of a method 400 for a cache circuit associated with a memory management unit (MMU)-less hypervisor system, according to one embodiment of the disclosure. In some embodiments, the method 700 is applicable to the cache circuit 104 in FIG. 1. Therefore, the method 700 is explained herein with reference to the cache circuit 104 in FIG. 1. However, in other embodiments, the method 700 may be applicable to any cache circuit associated with MMU-less hypervisor systems. At 402, an incoming cacheline data (e.g., the incoming cacheline data 116 in FIG. 1) comprising data associated with a select VM (e.g., VM1 in FIG. 1) of a plurality of VMs associated with a hypervisor system (e.g., the hypervisor system 100 in FIG. 1), is stored in a select cacheline (e.g., cacheline 0) of a plurality of cachelines (e.g., the plurality of cachelines 109a, 109b, 109c . . . 109N) associated with a cache memory circuit (e.g., the cache memory circuit 108 in FIG. 1), when a cache hit associated with the select VM occurs. At 404, a VM ID associated with the select VM is stored within a VM tag field of a tag array entry (e.g., the tag array entry 110a in FIG. 1) within the cache memory circuit that is associated with the select cacheline.

At 406, the select cacheline within the cache memory circuit to be utilized to store the incoming cacheline data associated with the select VM is determined, at a cache controller circuit (e.g., the cache controller circuit 112 in FIG. 1). In some embodiments, the select cacheline to be utilized to store the incoming cacheline data associated with select VM is determined from a set of available cachelines within the plurality of cachelines associated with the cache memory circuit that are available for the incoming cacheline data, as explained above with respect to FIG. 1 and FIG. 2. In some embodiments, when the set of available cachelines comprises one or more free cachelines having no data stored within, the select cacheline for storing the incoming cacheline data associated with the select VM is chosen from the one or more free cachelines. Alternately, when the set of available cachelines comprises a set of filled cachelines, respectively, each filled cacheline having data stored within, the select cacheline for storing the incoming cacheline data associated with the select VM is chosen from the set of filled cachelines, based on the VM ID stored within the VM tag field associated with the set of filled cachelines, in accordance with a predefined cacheline replacement algorithm (e.g., the cache replacement algorithm 300 in FIG. 3 above. At 408, the incoming cacheline data is loaded to the select cacheline, using the cache controller circuit. At 410, the VM ID associated with the select VM is provided to the cache memory circuit, to be stored within the VM tag field associated with the select cacheline, using the cache controller circuit.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a cache circuit associated with a hypervisor system, comprising a cache memory circuit comprising a plurality of cachelines, wherein each cacheline is configured to store data associated with one or more virtual machines (VMs) of a plurality of VMs associated with the hypervisor system; and a plurality of tag array entries respectively associated with the plurality of cachelines, wherein each tag array entry of the plurality of tag entries comprises: a tag field configured to store a tag identifier (ID) that identifies an address of a main memory circuit to which a data stored in the corresponding cacheline is associated; and a VM tag field configured to store a VM ID associated with a VM to which the data stored in the corresponding cacheline is associated.

Example 2 is a cache circuit, including the subject matter of example 1, wherein, when a cache miss associated with a select VM of the plurality of VMs occurs, the cache memory circuit is configured to store an incoming cacheline data comprising data associated with the select VM, in a select cacheline of the plurality of cachelines; and store a VM ID associated with the select VM within the VM tag field of the tag array entry that is associated with the select cacheline.

Example 3 is a cache circuit, including the subject matter of examples 1-2, including or omitting elements, wherein one or more cachelines within the plurality of cachelines are reserved for a select VM ID, wherein the select VM ID identifies one or more VMs of the plurality of VMs associated with the hypervisor system.

Example 4 is a cache circuit, including the subject matter of examples 1-3, including or omitting elements, further comprising a cache controller circuit configured to determine the select cacheline within the cache memory circuit to be utilized to store the incoming cacheline data associated with the select VM; load the incoming cacheline data to the select cacheline; and provide the VM ID associated with the select VM to the cache memory circuit to be stored within the VM tag field associated with the select cacheline.

Example 5 is a cache circuit, including the subject matter of examples 1-4, including or omitting elements, wherein the cache controller circuit is configured to determine the select cacheline to store the incoming cacheline data associated with the select VM from a set of available cachelines within the plurality of cachelines, wherein the set of available cachelines comprises one or more cachelines that are configured for storing the incoming cacheline data associated with the select VM.

Example 6 is a cache circuit, including the subject matter of examples 1-5, including or omitting elements, wherein the set of available cachelines are defined based on a predefined associativity defined for the cache memory circuit.

Example 7 is a cache circuit, including the subject matter of examples 1-6, including or omitting elements, wherein the predefined associativity comprises a VM-aware associativity.

Example 8 is a cache circuit, including the subject matter of examples 1-7, including or omitting elements, wherein, when the set of available cachelines comprises one or more free cachelines having no data stored within, the cache controller circuit is configured to choose the select cacheline for storing the incoming cacheline data associated with the select VM, from the one or more free cachelines.

Example 9 is a cache circuit, including the subject matter of examples 1-8, including or omitting elements, wherein, when the set of available cachelines comprises a set of filled cachelines, respectively, each filled cacheline having data stored within, the cache controller circuit is configured to choose the select cacheline for storing the incoming cacheline data associated with the select VM from the set of filled cachelines, based on the VM ID stored within the VM tag field associated with the set of filled cachelines, in accordance with a predefined cacheline replacement algorithm.

Example 10 is a hypervisor system, comprising a virtual machine (VM) circuit comprising a plurality of VMs, each VM configured to perform one or more operations associated with the hypervisor system; and a cache circuit comprising a cache memory circuit, the cache memory circuit comprising a plurality of cachelines, wherein each cacheline is configured to store data associated with one or more virtual machines (VMs) of the plurality of VMs associated with the hypervisor system; and a plurality of tag array entries respectively associated with the plurality of cachelines, wherein each tag array entry of the plurality of tag entries comprises a tag field configured to store a tag identifier (ID) that identifies an address of a main memory circuit to which a data stored in the corresponding cacheline is associated; and a VM tag field configured to store a VM ID associated with a VM to which the data stored in the corresponding cacheline is associated.

Example 11 is a hypervisor system, including the subject matter of example 10, wherein the plurality of VMs comprises a plurality of VM IDs, respectively, associated therewith.

Example 12 is a hypervisor system, including the subject matter of examples 10-11, including or omitting elements, wherein a set of VMs of the plurality of VMs comprises a same VM ID.

Example 13 is a hypervisor system, including the subject matter of examples 10-12, including or omitting elements, wherein, when a cache miss associated with a select VM of the plurality of VMs occurs, the cache memory circuit is configured to store an incoming cacheline data comprising data associated with the select VM, in a select cacheline of the plurality of cachelines; and store a VM ID associated with the select VM within the VM tag field of the tag array entry that is associated with the select cacheline.

Example 14 is a hypervisor system, including the subject matter of examples 10-13, including or omitting elements, wherein one or more cachelines within the plurality of cachelines are reserved for a select VM ID, wherein the select VM ID identifies one or more VMs of the plurality of VMs associated with the VM circuit.

Example 15 is a hypervisor system, including the subject matter of examples 10-14, including or omitting elements, wherein the cache circuit further comprises a cache controller circuit configured to determine the select cacheline within the cache memory circuit to be utilized to store the incoming cacheline data associated with the select VM; load the incoming cacheline data to the select cacheline; and provide the VM ID associated with the select VM to the cache memory circuit to be stored within the VM tag field associated with the select cacheline.

Example 16 is a hypervisor system, including the subject matter of examples 10-15, including or omitting elements, wherein the cache controller circuit is configured to determine the select cacheline to store the incoming cacheline data associated with the select VM from a set of available cachelines within the plurality of cachelines, wherein the set of available cachelines comprises one or more cachelines that are configured for storing the incoming cacheline data associated with the select VM.

Example 17 is a hypervisor system, including the subject matter of examples 10-16, including or omitting elements, wherein the set of available cachelines are defined based on a predefined associativity defined for the cache memory circuit.

Example 18 is a hypervisor system, including the subject matter of examples 10-17, including or omitting elements, wherein, when the set of available cachelines comprises one or more free cachelines having no data stored within, the cache controller circuit is configured to choose the select cacheline for storing the incoming cacheline data associated with the select VM, from the one or more free cachelines.

Example 19 is a hypervisor system, including the subject matter of examples 10-18, including or omitting elements, wherein, when the set of available cachelines comprises a set of filled cachelines, respectively, each filled cacheline having data stored within, the cache controller circuit is configured to choose the select cacheline for storing the incoming cacheline data associated with the select VM from the set of filled cachelines, based on the VM ID stored within the VM tag field associated with the set of filled cachelines, in accordance with a predefined cacheline replacement algorithm.

Example 20 is a method for a cache circuit associated with a hypervisor system, comprising storing an incoming cacheline data comprising data associated with a select VM of a plurality of VMs associated with the hypervisor system, in a select cacheline of a plurality of cachelines associated with a cache memory circuit; and storing a VM ID associated with the select VM within a VM tag field of a tag array entry within the cache memory circuit that is associated with the select cacheline, when a cache hit associated with the select VM occurs.

Example 21 is a method, including the subject matter of example 20, further comprising determining, at a cache controller circuit, the select cacheline of the plurality of cachelines within the cache memory circuit to be utilized to store the incoming cacheline data associated with the select VM; loading, using the cache controller circuit, the incoming cacheline data to the select cacheline; and providing, using the cache controller circuit, the VM ID associated with the select VM, to the cache memory circuit, to be stored within the VM tag field associated with the select cacheline.

Example 22 is a method, including the subject matter of examples 20-21, including or omitting elements, wherein determining the select cacheline within the cache memory circuit comprises determining the select cacheline from a set of available cachelines within the plurality of cachelines associated with the cache memory circuit, wherein the set of available cachelines comprises one or more cachelines that are configured for storing the incoming cacheline data associated with the select VM.

Example 23 is a method, including the subject matter of examples 20-22, including or omitting elements, wherein the set of available cachelines are defined based on a predefined associativity defined for the cache memory circuit.

Example 24 is a method, including the subject matter of examples 20-23, including or omitting elements, wherein, when the set of available cachelines comprises one or more free cachelines having no data stored within, the select cacheline for storing the incoming cacheline data associated with the select VM is chosen from the one or more free cachelines.

Example 25 is a method, including the subject matter of examples 20-24, including or omitting elements, wherein, when the set of available cachelines comprises a set of filled cachelines, respectively, each filled cacheline having data stored within, the select cacheline for storing the incoming cacheline data associated with the select VM is chosen from the set of filled cachelines, based on the VM ID stored within the VM tag field associated with the set of filled cachelines, in accordance with a predefined cacheline replacement algorithm.

Example 26 is a method, including the subject matter of examples 20-25, including or omitting elements, wherein the select cacheline is chosen from the set of filled cachelines in a way that a filled cacheline within the set of filled cachelines, having a VM ID that has a realtime priority, is not replaced by the incoming cacheline data associated with the select VM, when the VM ID associated with the select VM has a non-realtime priority.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A cache circuit associated with a hypervisor system, comprising:
   a cache memory circuit comprising:
      a plurality of cachelines, wherein each cacheline is configured to store data associated with one or more virtual machines (VMs) of a plurality of VMs associated with the hypervisor system; and
      a plurality of tag array entries respectively associated with the plurality of cachelines, wherein each tag array entry of the plurality of tag array entries comprises:

a tag field configured to store a tag identifier (ID) that identifies an address of a main memory circuit to which a data stored in a corresponding cacheline is associated; and a VM tag field configured to store a VM ID associated with a VM to which the data stored in the corresponding cacheline is associated.

2. The cache circuit of claim 1, wherein, when a cache miss associated with a select VM of the plurality of VMs occurs, the cache memory circuit is configured to:

store an incoming cacheline data comprising data associated with the select VM, in a select cacheline of the plurality of cachelines; and store a VM ID associated with the select VM within the VM tag field of a tag array entry that is associated with the select cacheline.

3. The cache circuit of claim 1, wherein one or more cachelines within the plurality of cachelines are reserved for a select VM ID, wherein the select VM ID identifies one or more VMs of the plurality of VMs associated with the hypervisor system.

4. The cache circuit of claim 2, further comprising a cache controller circuit configured to:

determine the select cacheline within the cache memory circuit to be utilized to store the incoming cacheline data associated with the select VM;

load the incoming cacheline data to the select cacheline; and provide the VM ID associated with the select VM to the cache memory circuit to be stored within the VM tag field associated with the select cacheline.

5. The cache circuit of claim 4, wherein the cache controller circuit is configured to determine the select cacheline to store the incoming cacheline data associated with the select VM from a set of available cachelines within the plurality of cachelines, wherein the set of available cachelines comprises one or more cachelines that are configured for storing the incoming cacheline data associated with the select VM.

6. The cache circuit of claim 5, wherein the set of available cachelines are defined based on a predefined associativity defined for the cache memory circuit.

7. The cache circuit of claim 6, wherein the predefined associativity comprises a VM-aware associativity.

8. The cache circuit of claim 5, wherein, when the set of available cachelines comprises one or more free cachelines having no data stored within, the cache controller circuit is configured to choose the select cacheline for storing the incoming cacheline data associated with the select VM, from the one or more free cachelines.

9. The cache circuit of claim 5, wherein, when the set of available cachelines comprises a set of filled cachelines, respectively, each filled cacheline having data stored within, the cache controller circuit is configured to choose the select cacheline for storing the incoming cacheline data associated with the select VM from the set of filled cachelines, based on the VM ID stored within the VM tag field associated with the set of filled cachelines, in accordance with a predefined cacheline replacement algorithm.

10. A hypervisor system, comprising:

a virtual machine (VM) circuit comprising a plurality of VMs, wherein each VM of the plurality of VMs is configured to perform one or more operations associated with the hypervisor system; and a cache circuit comprising a cache memory circuit, the cache memory circuit comprising:

a plurality of cachelines, wherein each cacheline is configured to store data associated with one or more virtual machines (VMs) of the plurality of VMs associated with the hypervisor system; and a plurality of tag array entries respectively associated with the plurality of cachelines, wherein each tag array entry of the plurality of tag array entries comprises:

a tag field configured to store a tag identifier (ID) that identifies an address of a main memory circuit to which a data stored in a corresponding cacheline is associated; and a VM tag field configured to store a VM ID associated with a VM to which the data stored in the corresponding cacheline is associated.

11. The hypervisor system of claim 10, wherein the plurality of VMs comprises a plurality of VM IDs, respectively, associated therewith.

12. The hypervisor system of claim 11, wherein a set of VMs of the plurality of VMs comprises a same VM ID.

13. The hypervisor system of claim 10, wherein, when a cache miss associated with a select VM of the plurality of VMs occurs, the cache memory circuit is configured to:

store an incoming cacheline data comprising data associated with the select VM, in a select cacheline of the plurality of cachelines; and store a VM ID associated with the select VM within the VM tag field of a tag array entry that is associated with the select cacheline.

14. The hypervisor system of claim 10, wherein one or more cachelines within the plurality of cachelines are reserved for a select VM ID, wherein the select VM ID identifies one or more VMs of the plurality of VMs associated with the VM circuit.

15. The hypervisor system of claim 13, wherein the cache circuit further comprises a cache controller circuit configured to:

determine the select cacheline within the cache memory circuit to be utilized to store the incoming cacheline data associated with the select VM;

load the incoming cacheline data to the select cacheline; and provide the VM ID associated with the select VM to the cache memory circuit to be stored within the VM tag field associated with the select cacheline.

16. The hypervisor system of claim 15, wherein the cache controller circuit is configured to determine the select cacheline to store the incoming cacheline data associated with the select VM from a set of available cachelines within the plurality of cachelines, wherein the set of available cachelines comprises one or more cachelines that are configured for storing the incoming cacheline data associated with the select VM.

17. The hypervisor system of claim 16, wherein the set of available cachelines are defined based on a predefined associativity defined for the cache memory circuit.

18. The hypervisor system of claim 16, wherein, when the set of available cachelines comprises one or more free cachelines having no data stored within, the cache controller circuit is configured to choose the select cacheline for storing the incoming cacheline data associated with the select VM, from the one or more free cachelines.

19. The hypervisor system of claim 16, wherein, when the set of available cachelines comprises a set of filled cachelines, respectively, each filled cacheline having data stored within, the cache controller circuit is configured to choose the select cacheline for storing the incoming cacheline data associated with the select VM from the set of filled cachelines, based on the VM ID stored within the VM tag field associated with the set of filled cachelines, in accordance with a predefined cacheline replacement algorithm.

20. A method for a cache circuit associated with a hypervisor system, comprising:
   storing an incoming cacheline data comprising data associated with a select VM of a plurality of VMs associated with the hypervisor system, in a select cacheline of a plurality of cachelines associated with a cache memory circuit; and
   storing a VM ID associated with the select VM within a VM tag field of a tag array entry within the cache memory circuit that is associated with the select cacheline, when a cache hit associated with the select VM occurs.

21. The method of claim 20, further comprising:
   determining, at a cache controller circuit, the select cacheline of the plurality of cachelines within the cache memory circuit to be utilized to store the incoming cacheline data associated with the select VM;
   loading, using the cache controller circuit, the incoming cacheline data to the select cacheline; and
   providing, using the cache controller circuit, the VM ID associated with the select VM, to the cache memory circuit, to be stored within the VM tag field associated with the select cacheline.

22. The method of claim 21, wherein determining the select cacheline within the cache memory circuit comprises determining the select cacheline from a set of available cachelines within the plurality of cachelines associated with the cache memory circuit, wherein the set of available cachelines comprises one or more cachelines that are configured for storing the incoming cacheline data associated with the select VM.

23. The method of claim 22, wherein the set of available cachelines are defined based on a predefined associativity defined for the cache memory circuit.

24. The method of claim 22, wherein, when the set of available cachelines comprises one or more free cachelines having no data stored within, the select cacheline for storing the incoming cacheline data associated with the select VM is chosen from the one or more free cachelines.

25. The method of claim 22, wherein, when the set of available cachelines comprises a set of filled cachelines, respectively, each filled cacheline having data stored within, the select cacheline for storing the incoming cacheline data associated with the select VM is chosen from the set of filled cachelines, based on the VM ID stored within the VM tag field associated with the set of filled cachelines, in accordance with a predefined cacheline replacement algorithm.

26. The method of claim 25, wherein the select cacheline is chosen from the set of filled cachelines in a way that a filled cacheline within the set of filled cachelines, having a VM ID that has a realtime priority, is not replaced by the incoming cacheline data associated with the select VM, when the VM ID associated with the select VM has a non-realtime priority.

* * * * *